US012770339B2

(12) United States Patent
Huynh et al.

(10) Patent No.: US 12,770,339 B2
(45) Date of Patent: Oct. 20, 2026

(54) INTERACTIVELY GENERATING A 3D MODEL USING A GENERATIVE MODEL

(71) Applicant: TOYOTA RESEARCH INSTITUTE, INC., Los Altos, CA (US)

(72) Inventors: Brandon Huynh, Los Angeles, CA (US); Scott Carter, San Jose, CA (US)

(73) Assignees: TOYOTA RESEARCH INSTITUTE, INC., Los Altos, CA (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 230 days.

(21) Appl. No.: 18/433,144

(22) Filed: Feb. 5, 2024

(65) Prior Publication Data

US 2025/0252676 A1 Aug. 7, 2025

(51) Int. Cl.
*G06T 19/00* (2011.01)
*G06T 17/00* (2006.01)
*G06T 19/20* (2011.01)

(52) U.S. Cl.
CPC ............ *G06T 19/006* (2013.01); *G06T 17/00* (2013.01); *G06T 19/20* (2013.01)

(58) Field of Classification Search
None
See application file for complete search history.

(56) References Cited

U.S. PATENT DOCUMENTS 10,228,836 B2 3/2019 Palmaro
11,087,528 B1 8/2021 Couture-Gagnon
11,556,678 B2 1/2023 Mehr
2024/0378801 A1 * 11/2024 Rivas Vetencourt ... G06F 21/16

FOREIGN PATENT DOCUMENTS

AU 2017225016 A1 5/2018

OTHER PUBLICATIONS

Malik et al., A Cyber-Physical System to Design 3D Models Using Mixed Reality Technologies and Deep Learning for Additive Manufacturing, PLOS ONE; Jul. 27, 2023.
Weichel et al., MixFab: A Mixed-Reality Environment for Personal Fabrication, Apr. 26, 2014-May 1, 2014; CHI 2014; Proceedings of the SIGCHI Conference on Human Factors in Computing Systems, Toronto, Ontario, Canada.
Hu et al., Exploring the Design Space of Employing AI-Generated Content for Augmented Reality Display, Mar. 29, 2023; arXiv:2303.16593.
Lui et al.; Interactive 3D Modeling with a Generative Adversarial Network, Jan. 7, 2018; arXiv:1706.05170.
Lee et al., Posing and Acting as Input for Personalizing Furniture; NordiCHI'16, Oct. 23-27, 2016, Gothenburg, Sweden.

* cited by examiner

*Primary Examiner* — Robert J Craddock
(74) *Attorney, Agent, or Firm* — Seyfarth Shaw LLP

(57) ABSTRACT

A method for generating a 3D model at an augmented reality (AR) device includes receiving, from a user, a first user input indicating an object to be placed within an AR environment shown to the user via the AR device and a second user input indicating a primitive associated with the object. The method also includes generating, via a generative model associated with the AR device, a 3D model of the object based on the first user input and the second user input. The method further includes displaying the 3D model of the object within the AR environment based on generating the 3D model.

20 Claims, 9 Drawing Sheets

INTERACTIVELY GENERATING A 3D MODEL USING A GENERATIVE MODEL

BACKGROUND

Field

Aspects of the present disclosure generally relate to generative artificial intelligence (AI) models, and more specifically to systems and methods for interactively generating 3D models in augmented reality using a generative model.

Background

Generative models, such as generative artificial intelligence (AI) models, exemplify the capabilities of AI models trained on extensive datasets of pre-existing content (hereinafter referred to as "training data"). Based on this training, generative models (e.g., generative AI models, hereinafter used interchangeably) may discern intricate patterns and establish meaningful connections within the training data and/or input data. When provided with a prompt, the generative model may create content, such as text, images, and/or music, in accordance with the training data and/or previous input data.

Augmented reality (AR) is a technology that blends digital information and computer-generated objects with a real-world environment, typically through a user'"s view that is captured by a device such as a smartphone or AR headset. AR relies on computer vision, sensors, and real-time processing to superimpose virtual elements, such as 3D graphics, text, and/or interactive animations, onto the 'user's perception of the physical world, allowing for an immersive and interactive experience. AR applications often use markers, positioning systems, or spatial recognition to anchor digital content to specific locations or objects in the real world, enhancing user engagement and providing context-aware information.

SUMMARY

In one aspect of the present disclosure, a method for processing text prompts includes identifying a set of elements in a text prompt that form a basis for a generative output. The method also includes identifying an element of the set of elements that satisfy a refinement condition. The method further includes updating the element based on the element satisfying the refinement condition. The method further includes generating the generative output in accordance with updating the element.

Another aspect of the present disclosure is directed to an apparatus including means for identifying a set of elements in a text prompt that form a basis for a generative output. The apparatus further includes means for identifying an element of the set of elements that satisfy a refinement condition. The apparatus also includes means for updating the element based on the element satisfying the refinement condition. The apparatus further includes means for generating the generative output in accordance with updating the element.

In another aspect of the present disclosure, a non-transitory computer-readable medium with non-transitory program code recorded thereon is disclosed. The program code is executed by a processor and includes program code to identify a set of elements in a text prompt that form a basis for a generative output. The program code also includes program code to identify an element of the set of elements that satisfy a refinement condition. The program code further includes program code to update the element based on the element satisfying the refinement condition. The program code still further includes program code to generate the generative output in accordance with updating the element.

Another aspect of the present disclosure is directed to an apparatus having a processor, and a memory coupled with the processor and storing instructions operable, when executed by the processor, to cause the apparatus to identify a set of elements in a text prompt that form a basis for a generative output. Execution of the instructions also cause the apparatus to identify an element of the set of elements that satisfy a refinement condition. Execution of the instructions further cause the apparatus to update the element based on the element satisfying the refinement condition. Execution of the instructions still further cause the apparatus to generate the generative output in accordance with updating the element.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
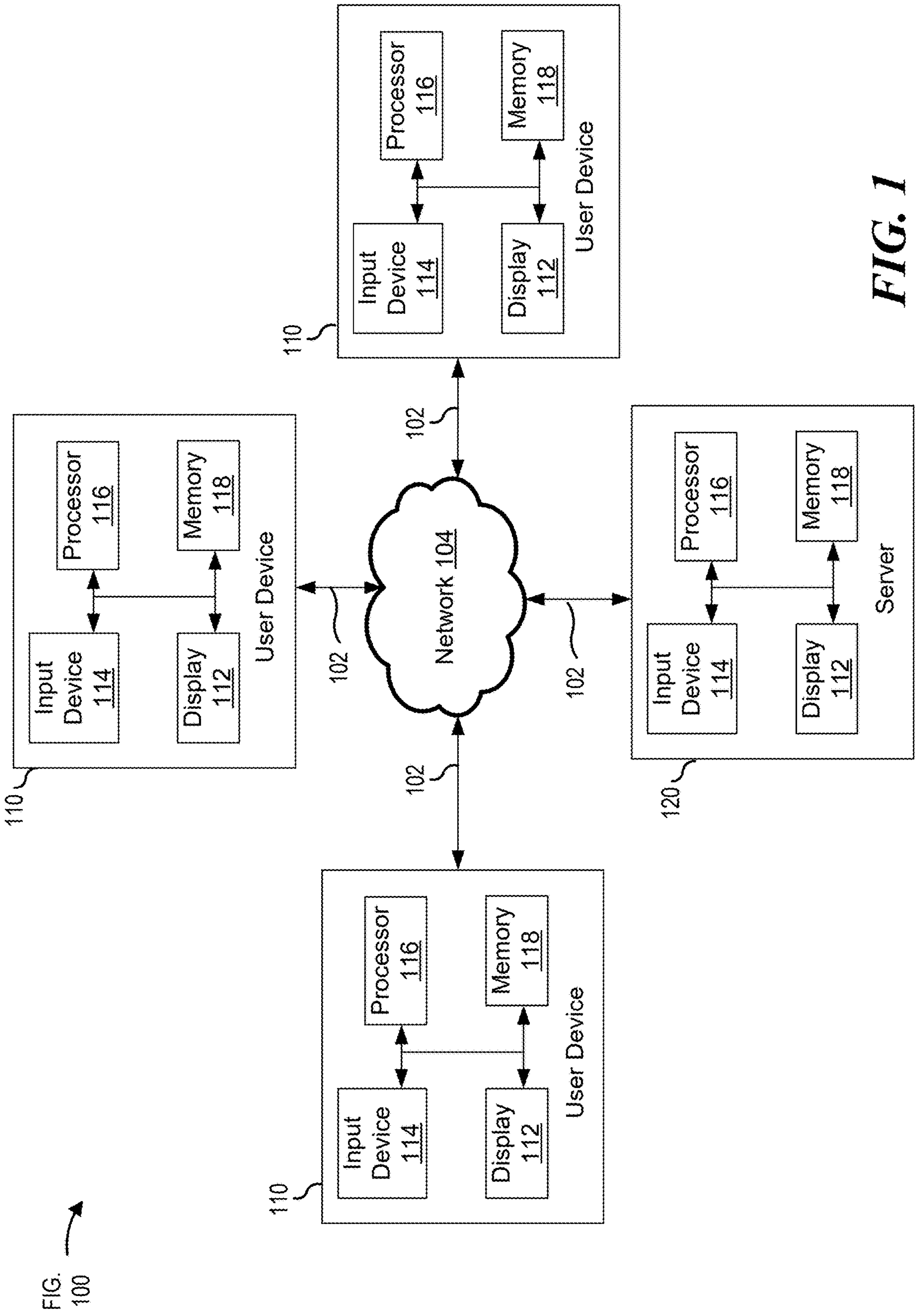
FIG. 1 is a block diagram illustrating an example of a system generating content via a generative artificial intelligence (AI) model, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented, or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks, and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As discussed, generative models are trained to discern patterns and establish meaningful connections within datasets of pre-existing content (hereinafter referred to as "training data"). The generative model may also be referred to as a generative AI model or a 3D generative model. Based on this training, generative models may discern intricate patterns and establish meaningful connections within the input data. When provided with a prompt, the generative model may create content, such as, but not limited to, text, images, and/or music, in accordance with the training data and/or previous input data.

In conventional augmented reality (AR) applications, the integration of 3D content into real-world settings primarily relies on a library of pre-designed 3D objects. These 3D objects are often crafted offline by professional 3D artists or designers, without precise information about the real-world context of where their creations will be deployed. Emerging generative AI models, particularly those capable of generating 2D images, allow for a more dynamic interaction. These AI models can produce images from prompts that users can further refine through iterative text prompt adjustments. However, such versatility has not yet been achieved for 3D object generation, mainly because of the complex task of detailing an object's geometry, physical dimensions, or appearance, solely through textual descriptions.

Various aspects of the present disclosure are directed to generating 3D objects for display in AR scenes via a generative model. In some examples, a user may use a device to generate 3D objects via a generative model. The 3D object may also be referred to as a 3D model. In such examples, the device may be an AR device or a virtual reality (VR) device. For ease of explanation, various aspects are described with respect to the AR device, however, such aspects may also be implemented via a VR device. The AR device may implement an array of sensors to capture spatial information regarding the user's environment, these sensors may include, but are not limited to, cameras, depth sensors, infrared sensors, and/or LiDAR (Light Detection and Ranging) sensors. The user may prompt the AR device to initiate a 3D object generation process via a voice prompt, text prompt, or gesture prompt. The prompt may include a primitive indication, object indication, and/or a parameter indication. The primitive indication indicate a geometric shape, such as a cube or a sphere. The object indication may indicate a generic object, such as a piece of furniture or fixture. The parameter indication may indicate a feature of the object, such as color, size, or texture.

As an example, the user may prompt the AR device to create a chair. In this example, the user may then select a primitive, such as a sphere, in which the primitive is associated with a desired shape of the chair. The user may then manipulate a size of the sphere within an environment displayed via the AR device. After re-sizing the sphere, the user may then prompt a generative model associated with the AR device to generate the chair based on the sphere. In this example, the generative model may render (e.g., generate) a chair corresponding to the size and shape of the sphere. The AR device may display the chair (e.g., 3D object) rendered by the generative model. In some examples, the user may then specify one or more parameters for the chair, such as a color and/or texture. The generative model may then regenerate the 3D object based on the one or more parameters. The AR device may then display a new 3D object based on the user's indications. The user may repeatedly regenerate 3D objects in this manner until the user is satisfied with a final 3D object. The AR device may use one or more known generative models, such as Shap-E, to generate the 3D objects. Additionally, or alternatively, the AR device may use a proprietary generative model.

Particular aspects of the subject matter described in this disclosure can be implemented to realize one or more of the following potential advantages. In some examples, the described techniques, such as generating 3D objects for display in AR scenes via generative AI, enable an AR device to dynamically render virtual content based on the context of the user's environment. Other advantages include faster and more cost-effective 3D object creation compared to that of a professional 3D artist. The generative model may also regenerate 3D objects according to the user's specifications, allowing the user to incrementally create a desired 3D object instead of having to restart the 3D modeling process if the user dislikes an initially generated 3D object.

FIG. 1 is a block diagram illustrating an example of a system 100 generating content via a generative AI model, in accordance with aspects of the present disclosure. The generative model may also be referred to as a 3D generative model or generative AI model, hereinafter used interchangeably. As shown in the example of FIG. 1, the system 100 may include one or more user devices 110 and one or more servers 120. For case of explanation, only one server 120 is shown in the example of FIG. 1. Each user device 110 may be connected to a network 104 via one or more communication links 102. The communication links 102 may be wired and/or wireless communication links. The server 120 may also be connected to the network 104 via a communication link 102.

The network 104 may be an example of the Internet. Additionally, or alternatively, the network 104 may include any suitable computer network such as an intranet, a wide-area network (WAN), a local-area network (LAN), a wireless network, a digital subscriber line (DSL) network, a frame relay network, an asynchronous transfer mode (ATM) network, and/or a virtual private network (VPN). The communication links 102 may be any type of communication link that may be suitable for communicating data between user devices 110 and the server 120. For example, the communication links 102 may network links, dial-up links, wireless links (e.g., Wi-Fi link, satellite link, or cellular communication link), and/or hard-wired links.

The server 120 may be a computing device, such as a server, processor, computer, cloud computing device, cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to host a generative AI model and communicate via a wireless or wired medium. In some examples, the server 120 may host a generative AI model. In some such examples, one or more server 120 may work in tandem to host the generative AI model. Specifically, the server 120 may implement functions and/or computer code that runs the generative AI model and/or a site, such as a website, for accessing the generative AI model.

Each user device 110 may be an example of a personal computing device, a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. A user device 110 may be used by a user to input a prompt to a generative AI model via an interface associated with the generative AI model. The interface may be accessed via a website or a dedicate application, such as a mobile phone application. Additionally, or alternatively, the user device 110 may store the generative AI model, and the user may input a prompt via an interface associated with the stored generative AI model. In some examples, each user device 110 shown in FIG. 1 may be used by a different user. Each user device 110 and server 120 may be stationary or mobile.

In some examples, each user device 110 may be included inside a housing that houses components of the user device 110, such as one or more processors 116 and a memory 118. The housing may also include, or be connected to, a display 112 and an input device 114, which may be interconnected with other components of the user device 110. For case of explanation, only one processor 116 is shown for each user device 110. In some examples, the one or more processors 116, the display 112, the input device 114, and the memory 118 may be interconnected via a bus architecture. The memory 118 may include one or more different types of memory, such as random access memory (RAM), static RAM (SRAM), dynamic RAM (DRAM), and/or another type of memory. Each user device 110 may also include a storage device (not shown in the example of FIG. 1), such as a hard disk (e.g., non-transitory computer readable medium). In some examples, the memory 118 and/or the storage device include program code (e.g., instructions) that may be executed by the processor 116 to control one or more functions of the user device 110. The input device 114 may be used to navigate the interface associated with the generative AI model, provide input to a prompt engineering model, and/or perform other tasks. Working in conjunction with one or more components of the user device 110, the processor 116 may receive information associated with the generative AI model, and control the display 112 to output information associated with the generative AI model. The display 112 may output (e.g., display) information received at the processor 116. In some examples, the processor 116 of the user device 110 is configured to perform operations and implement one or more elements associated with one or more processes, such as the process 700 described with respect to FIG. 7.

In some examples, the server 120 may be included inside a housing that houses components of the server 120, such as one or more processors 116 and a memory 118. The housing may also include, or be connected to, a display 112 and an input device 114, which may be interconnected with other components of the user device 110. For ease of explanation, only one processor 116 is shown for the server 120. In some examples, the one or more processors 116, the display 112, the input device 114, and the memory 118 may be interconnected via a bus architecture. The memory 118 may include one or more different types of memory, such as RAM, SRAM, DRAM, and/or another type of memory. The server 120 may also include a storage device (not shown in the example of FIG. 1), such as a hard disk (e.g., non-transitory computer readable medium). In some examples, the memory 118 and/or the storage device include program code (e.g., instructions) that may be executed by the processor 116 to control one or more functions of the server 120. For example, the processor 120 may execute instructions for maintaining the generative AI model, training the generative AI model, and/or executing the generative AI model. In some examples, the processor 116 of the server 120 is configured to perform operations and implement one or more elements associated with one or more processes, such as the process 700 described with respect to FIG. 7. Additionally, or alternatively, the processor 116 of the server 120 may be configured to perform operations associated with the 3D generative model 260 described with reference to FIG. 2.

Figure 2:
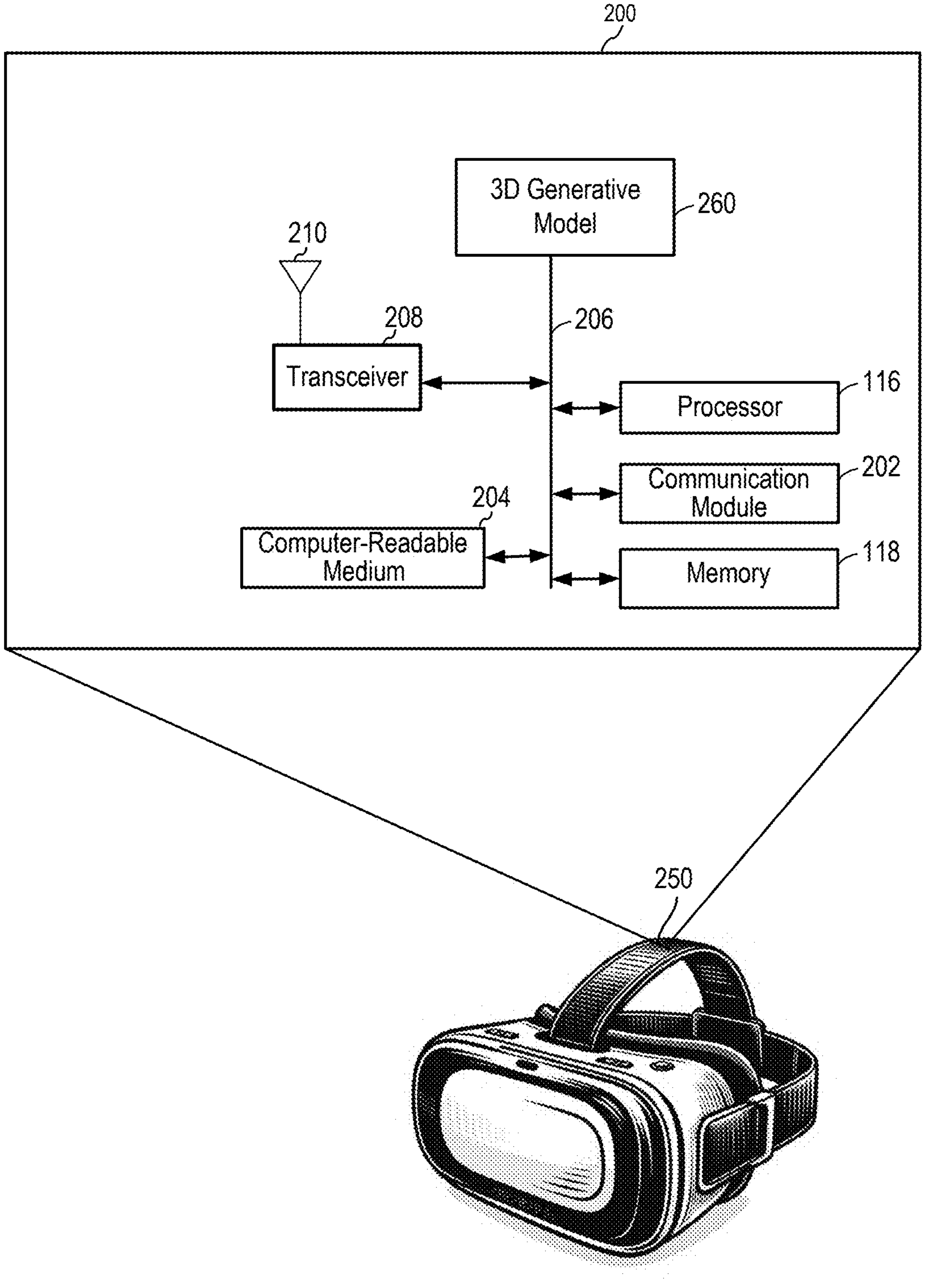
FIG. 2 is a diagram illustrating an example of a hardware implementation for a system, in accordance with various aspects of the present disclosure.

FIG. 2 is a diagram illustrating an example of a hardware implementation for a system 200, according to various aspects of the present disclosure. The system 200 may be a component of a device 250. The device 250 may be an example of a user device 110 or a server 120 described with reference to FIG. 1. As shown in the example of FIG. 2, the device 250 may include a display 112 and an input device 114 (e.g., a keyboard). In some examples, the system 200 is configured to perform operations and implement one or more elements associated with one or more processes, such as the process 700 described with reference to FIG. 7.

The system 200 may be implemented with a bus architecture, represented generally by a bus 206. The bus 206 may include any number of interconnecting buses and bridges depending on the specific application of the system 200 and the overall design constraints. The bus 206 links together various circuits including one or more processors and/or hardware modules, represented by a processor 116, and a communication module 202. The bus 206 may also link various other circuits such as timing sources, peripherals, voltage regulators, and power management circuits, which are well known in the art, and therefore, will not be described any further.

The system 200 includes a transceiver 208 coupled to the processor 116, the communication module 202, and the computer-readable medium 204. The transceiver 208 is coupled to an antenna 210. The transceiver 208 communicates with various other devices over a transmission medium, such as a communication link 102 described with reference to FIG. 1. For example, the transceiver 208 may receive commands via transmissions from a user or a remote device.

As shown in the example of FIG. 2, the system 200 may include a 3D generative model 260 that may be trained to perform one or more tasks associated with generating a 3D object. For example, the 3D generative model 260 may be trained to perform the tasks described with reference to the one or more modules and engines described with reference to FIG. 5. The 3D generative model 260 may include artificial or computational intelligence elements, such as, neural network, fuzzy logic, or other machine learning algorithms. In one or more arrangements, one or more of the other modules 116, 118, 202, 204, 208, can also include artificial or computational intelligence elements, such as, neural network, fuzzy logic, or other machine learning algorithms. Further, in one or more arrangements, one or more of the modules 116, 118, 202, 204, 208 can be distributed among multiple modules 116, 118, 202, 204, 208, 260 described herein. In one or more arrangements, two or more of the modules 116, 118, 202, 204, 208, 260 of the system 200 can be combined into a single module.

The system 200 includes the processor 116 coupled to the computer-readable medium 204. The processor 116 performs processing, including the execution of software stored on the computer-readable medium 204 providing functionality according to the disclosure. The software, when executed by the processor 116, causes the system 200 to perform the various functions described for a particular device, such as any of the modules 116, 118, 202, 204, 208, 260. For example, when executed by the processor 116, the software causes the system 200 and/or the 3D generative model 260 to implement one or more elements associated with one or more processes, such as the process 700 described with respect to FIG. 7. The computer-readable medium 204 may also be used for storing data that is manipulated by the processor 116 when executing the software. For example, working in conjunction with one or more of the other modules the modules 116, 118, 202, 204, and 208, the 3D generative model 260 may perform one or more operations, such as one or more operations associated with the process 700 described with respect to FIG. 7 and/or one or more operations associated with the process 800 described with respect to FIG. 8.

As indicated above, FIGS. 1 and 2 are provided as examples. Other examples may differ from what is described with regard to FIGS. 1 and 2.

Figure 3:
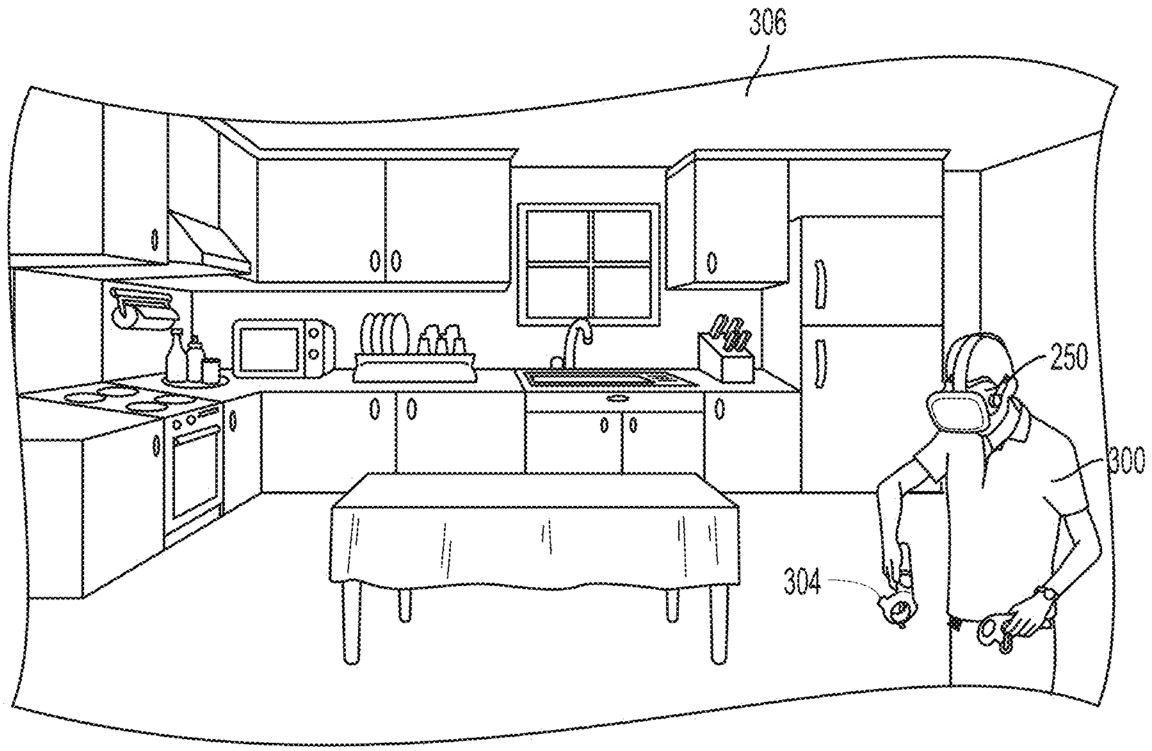
FIG. 3 is a diagram illustrating an example user in an environment, in accordance with various aspects of the present disclosure.

FIG. 3 illustrates an example user 300 wearing a device 250, in accordance with various aspects of the present disclosure. The device 250 is a wearable device designed to integrate virtual information with the physical surroundings of the user 300. The device 250 is not limited to the design shown in FIGS. 2 and 3. Other designs for the device 250 are contemplated, such as, but not limited to, lightweight glasses or goggles to more immersive helmet-like designs, each catering to specific use cases and preferences. In some examples, the device 250 may implement one display system of multiple different display systems. In some such examples, the device 250 may use an optical see-through display, which employs transparent lenses or beam-splitting technology to overlay digital content onto the user's 300 field of view while still allowing the user 300 to see the real world. Additionally, or alternatively, the device 250 may use a video see-through display, where cameras capture the real-world environment, and digital content is then overlaid onto a screen in front of the user's 300 eyes. In some other examples, the device 250 is a virtual reality device that displays a virtual rendering of the scene 306 or another environment.

The device 250 may provide an AR or VR view of the scene 306 to the user 300 via the user's point of view, or through another point of view. The example of FIG. 3 illustrates the scene 306 and the user 300 from a third-person point of view. The scene 306 may be a virtual environment, a composition of digital elements overlaid onto the real-world surroundings, or a real-world environment. As discussed, if the device 250 is a VR device, the scene 250 may be entirely virtual. The scene 306 may consist of 3D graphics, text, or interactive objects integrated into the user's 300 field of view, creating a composite view that blends virtual and physical elements. Scenes are designed to enhance the 'user's 300 perception of reality by providing additional information, context, or interactive elements within their immediate surroundings, often experienced through AR-enabled devices like smartphones, tablets, or headsets. In the example of FIG. 3, the scene 306 is a kitchen, wherein one or more objects, such as a table, cabinets, or a refrigerator may be real physical objects and/or one or more other objects, such as knives, a microwave, or dishes may be virtual objects, for example.

The device 250 may use one or more methods to capture gesture information from the user 300. In the example of FIG. 3, the user 300 is equipped with two wands 304. Each wand 304 is a handheld device equipped with motion tracking technology that allows user 300 to interact with virtual elements in their physical environment, often using movements or other spatial inputs to manipulate digital content or control applications. By using the wand 304, the user 300 can manipulate and control connected devices by interacting with virtual buttons, sliders, or gestures superimposed onto their physical environment. In other examples, the user 300 may instead use their hands, without any wand 304, to gesture. The device 250 may then capture these gestures via a series of sensors in the device 250.

After capturing a gesture of the user 300, the device 250 may then alter the scene 306 to react to that gesture. For example, if the user 300 is holding a virtual sword, the user 300 may swing a wand 304 to swing the sword in the scene 306. In another example, the user 300 may throw a ball at a real window. The virtual ball may then bounce off of the real window. Alternatively, the virtual ball may appear to pass through the window, and the device 250 may superimpose a virtual shattering animation onto the scene 306, such that the window appears to break from a perspective of the user 300.

Figure 4A:
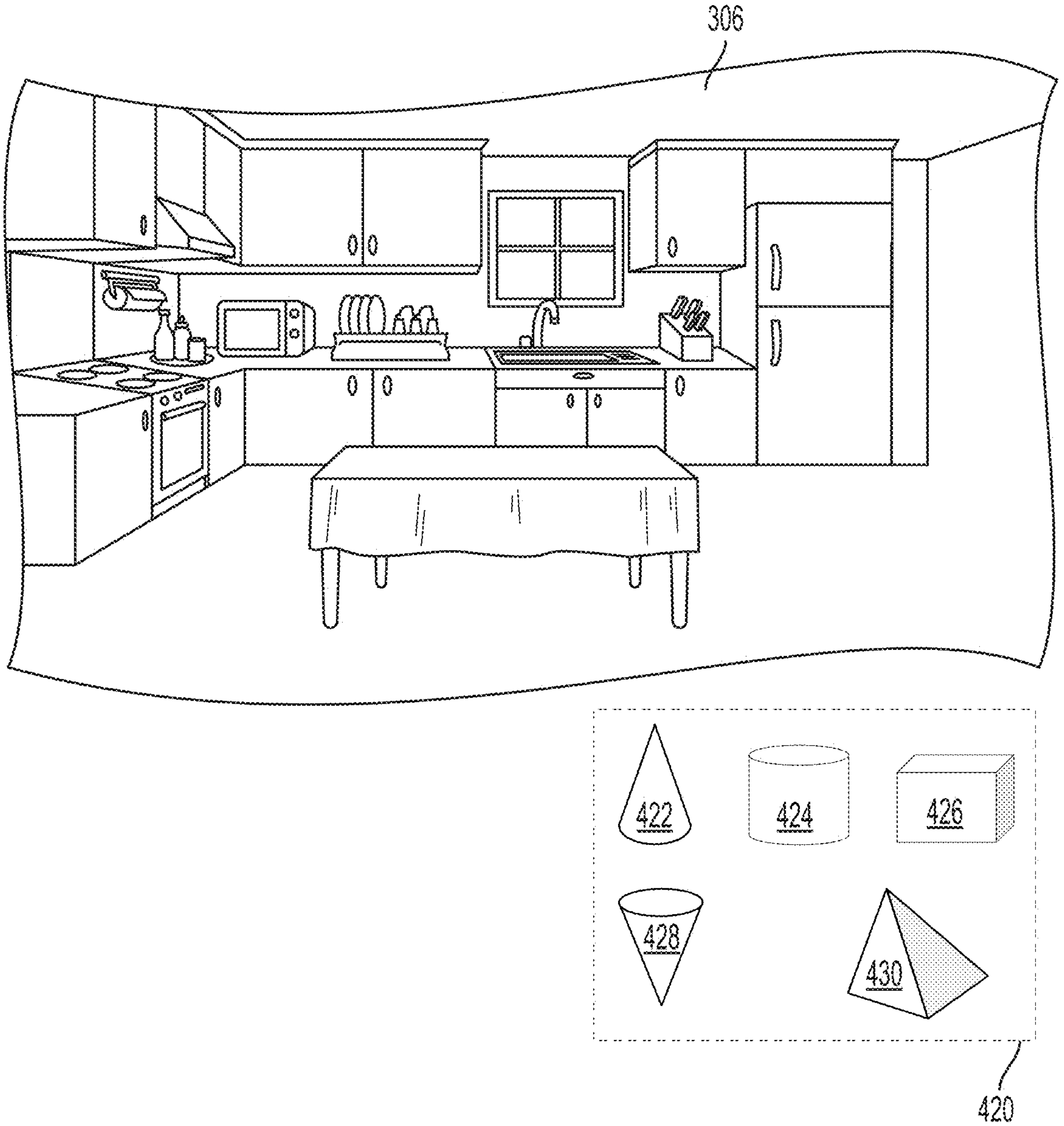
FIG. 4A is a diagram illustrating an example of an augmented reality (AR) scene from a user's point of view, in accordance with various aspects of the present disclosure.

FIG. 4A is a diagram illustrating an example of an AR scene 306 from a user's 300 point of view, in accordance with various aspects of the present disclosure. The AR scene 306 may also be referred to as the scene 306. FIG. 4A, shows the scene 306 from the user's 300 point of view while the user is wearing a device 250. As shown in FIG. 4A, the user 300 sees a kitchen, including a table, appliances, and counters. The objects illustrated in the scene 306 may include one or more real objects and/or one or more virtual objects.

In some examples, the user 300 may perform one or more actions to initiate the generative modeling process. In some such examples, the user 300 may provide an object input indicating an object to be placed within the scene 306 and/or a primitive input indicating a primitive associated with the object. The user may first provide the object input and then the primitive input, or vice versa. Each of the object input and primitive input may be provided via an audio (e.g., vocal) input or a text input from the user 300.

For example, the user 300 may provide an input: "create a chair." In this example, the generative model may then provide a set of primitives 420 for the user 300 to select. The set of primitives 420 may be displayed by the device 250 in the field of view of the scene 306 or in another location, such as a menu or notification location of the display. For case of explanation, the set of primitives 420 is shown as non-overlapping with the scene 306. The set of primitives 420 may include one or more primitives 422, 424, 426, 428, and 430 for the user to select from. Aspects of the present disclosure are not limited to the primitives 422, 424, 426, 428, and 430 shown in the example of FIG. 4A, additional or fewer primitives may be used. Additionally, or alternatively, one or more of the primitives may be 2D primitives used to represent a 3D primitive. A 3D model of the chair may then be generated based on one or more primitives 422, 424, 426, 428, and 430 selected by the user 300. Alternatively, the user may first select one or more primitives 422, 424, 426, 428, and 430 in response to an input (e.g., audio or text input) to display the set of primitives 420. After selecting the one or more primitives 422, 424, 426, 428, and 430, the user 300 may then provide an input (e.g., prompt) to generate a 3D model (e.g., 3D object) based on the one or more selected primitives.

In some examples, the device 250 may implement a shape specification tool that incorporates pre-made primitive shapes such as cubes, spheres, and cylinders. For example, the user 300 may input: "create a cube." In this example, the device 250 may access a library of pre-made 3D shapes and display a 3D model of a cube from the library. In some aspects, the user 300 may provide both the primitive input and the object input at the same time. For example, the user 300 may input: "create a chair using the shape of a cube." In this example, the generative model may receive "create a chair using the shape of a cube" as a single prompt, or the device 250 may break the prompt into separate pieces, such as "create a chair" having a shape of a "cube."

As discussed, the user 300 may implement the generative model to generate a 3D object from a 3D primitive. For example, the user 300 may select a cube and place the cube in the scene 306. The user 300 may then provide a second input instructing the device 250 to generate a refrigerator from the cube. In some examples, the user 300 may utilize 3D painting capabilities to freeform a size and/or shape of the cube, such that the rendered refrigerator corresponds to the size and/or shape of the cube. Additionally, in some such examples, the user 300 may interact with the cube in such a way as to mold handles and doors onto the rendered object or initial using other primitives. For example, after generating the refrigerator, the user 300 may add another primitive corresponding to the handle. In this example, in response to an input from the user 300, the generative model may then add a handle to the refrigerator using the new primitive.

Figure 4B:
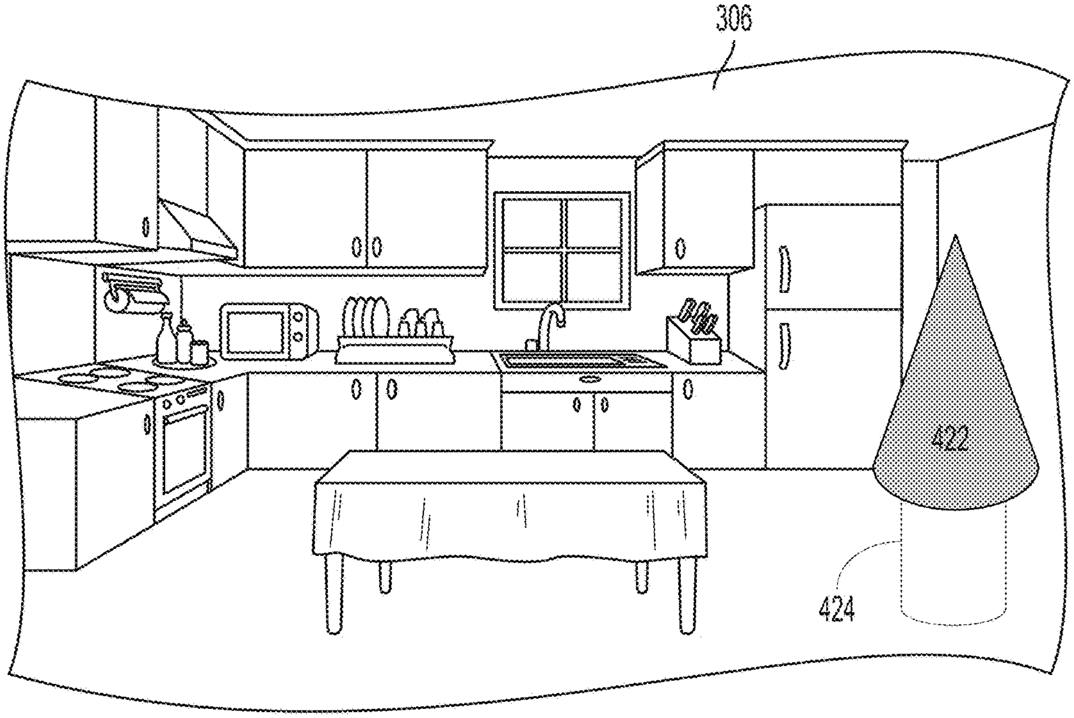
FIG. 4B is a diagram illustrating an example of primitives placed in a scene, in accordance with various aspects of the present disclosure.

In the example of FIG. 4A, the user may select a first primitive 422 and a second primitive 424 to generate a desired object, such as a lamp. Using the handles 304, or another input device, the user 300 may place the first primitive 422 and the second primitive 424 in the scene 306. FIG. 4B is a diagram illustrating an example of primitives 422 and 424 placed in the scene 306, in accordance with various aspects of the present disclosure. As discussed, the user 300 may manipulate each primitive (e.g., 3D primitive) in the scene 306 to achieve a desired size and/or shape of the desired object (e.g., 3D object). For example, the user may re-size and/or re-shape each of the primitives 422 and 424. This process may be similar to molding a virtual clay object. The primitives 422 and 424 may be manipulated via input from one or more input devices, such as the user's 300 hands, one or more wands 304, other input devices, or a voice input. As an example, the user 300 may decrease the radius of the cylinder 424, curve the outside of the cylinder 424, and remove the top quarter portion of the cone 422. A shape and/or size of the primitives 422 and 424 may be updated in real-time in response to the manipulation by the user 300.

In some examples, before, or after, generating the 3D object (e.g., 3D model) the user 300 may provide another user input specifying one or more parameters associated with the 3D object. The parameter may pertain to an attribute of the 3D object, such as a texture, color, or feature. For example, in the example of FIG. 4B, the user 300 may specify for the cone to have a specific color, such as grey. The color may be specified via user input. The color parameter may also be specified after the object is rendered. In such examples, the generative model may then re-render the object.

For example, after the generative model renders the 3D model of the lamp 440 (shown in FIG. 4C), the user 300 may prompt the device 250 re-render the lamp 420 with a shiny texture. If the device 250 receives multiple inputs from the user 300, such as an object indication and a primitive indication, the user 300 may provide these inputs in any order. For example, the user 300 may first provide an object indication, then a parameter indication, and then a primitive indication. After the user 300 has provided one or more indications to the device 250, the device 250 may display a 3D model of an object within the environment based on generating, via a generative model associated with the device 250, the 3D model in accordance with the indications.

In the example of FIG. 4B, after the user 300 has placed the primitives 422 and 424 in a desired location and with the desired size and/or shape, the user 300 may then prompt the device 250 to generate the desired 3D object. In this example, the user 300 prompts the device 250 to generate a lamp. The prompt (e.g., input) may be passed from one or more components, such as one or more processors associated with the device 250, to a generative model, such as the 3D generative model 260 described with reference to FIG. 2. In response to receiving the input, the 3D generative model 260 may generate (e.g., render) the lamp 440, and the lamp 440 may be displayed via the device 250.

Figure 4C:
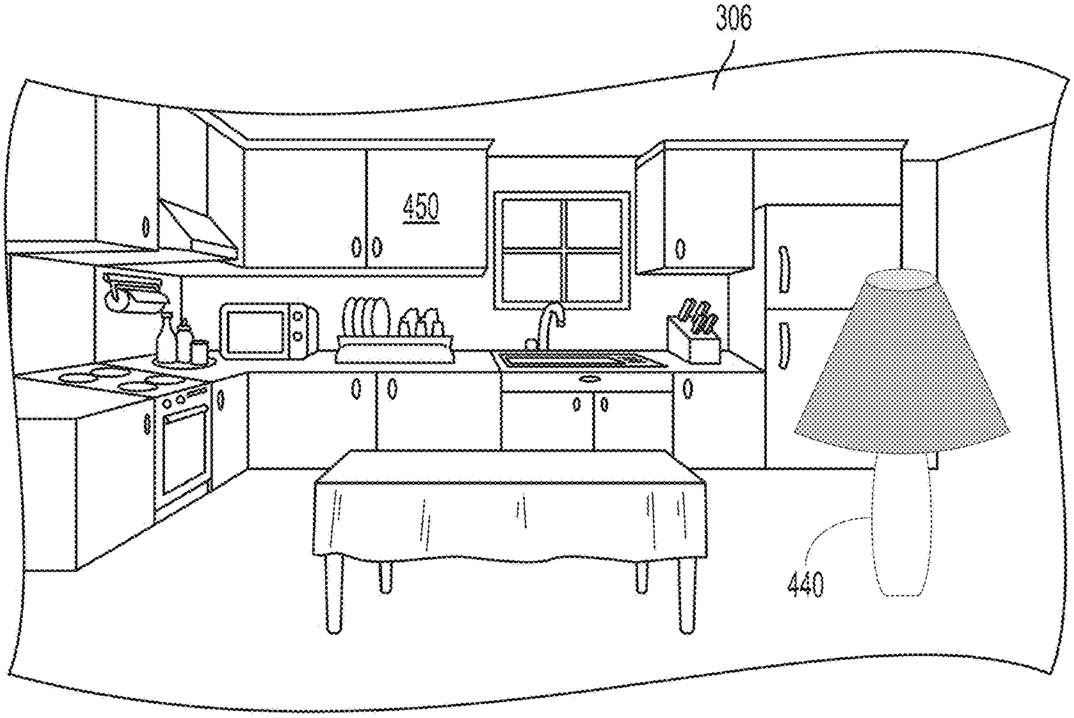
FIG. 4C is a diagram illustrating an example of a 3D object generated in an AR scene based on one or more primitives provided by a user, in accordance with various aspects of the present disclosure.

FIG. 4C is a diagram illustrating an example of a 3D object (e.g., lamp 440) generated in the AR scene 360 based on one or more primitives 422 and 424 provided by the user 300, in accordance with various aspects of the present disclosure. As shown in the example of FIG. 4C, the lamp 440 has an overall look corresponding to the placement of the primitives 422 and 424 (FIG. 4B). The user may then manipulate (e.g., move, re-size, and/or re-shape) the lamp 440 within the scene 306 via one or more inputs. The lamp 440 is a virtual object generated via the generative model and displayed as part of the scene 306 (e.g., AR scene or AR environment).

In some examples, the generative model may customize the 3D object, such as the lamp 440, based on one or more elements associated with the scene 306. For example, the user 300 may intend for the lamp 440 to match a styling of the kitchen cabinets 450. In some examples, the prompt for generating the lamp 440 may specify for the lamp 440 to match the cabinets 450. For example, the user 300 may input: "generate a lamp matching the cabinets," instead of "generate a lamp." Alternatively, after the generative model generates the lamp 440, the user may prompt the generative model to re-render the 3D object (e.g., lamp 440) to match one or more objects, such as the cabinets 450. That is, the user 300 may refine the output of the generative model to match one or more aspects of the scene 306. Additionally, or alternatively, the user 300 may refine specific aspects of the output. For example, the user 300 may provide additional primitives to generate, for example, additional elements for the lamp 440. Further, the generative model may customize the 3D object based on one or more elements associated with the AR environment (e.g., scene 306). The device 250 may also constrain one or more parameters of the 3D object based on a location of the AR environment. The location may be determined via a positioning system, such as GPS. For example, the device 250 may generate only education-related objects if the user 300 is on a school campus or car-themed objects if the user 300 is at an auto dealership.

In some examples, the user 300 may use a texturing tool to leverage real-world materials as textures for the 3D object. In some such examples, the user 300 may specify a physical point in their surroundings via a gaze, input, or raycast. The device 250 may use a sensor to capture an image centered around the position specified by the user 300. The device 250 may then use a semantic segmentation technique to identify the boundaries of the object surface containing the specified point. The identified texture may then be used to render or re-render the 3D object. Additionally, in some examples, the resulting boundary may be stored in a user's 300 material library for future use. The material library may include textures stored by the user 300 and pre-populated textures comprising common real-world materials. For example, the material library may include a wood grain texture to use for a surface of a 3D object.

In some examples, the user 300 may select one or more colors of the 3D object using a color palette. The color palette may be displayed via a user interface (UI) of the device 250. For example, the color palette may be displayed in the form of a color table rendered within the user's 300 field-of-view. The user 300 may then select a color from the color palette for the device 250 to use when generating the 3D object.

The device 250 may create or maintain one or more databases associated with the user's 300 preferences, such as the material library. For example, the device 250 may store the user's 300 most commonly used colors, shapes, and textures. The device 250 may store the colors, shapes, and textures individually, or as mesh components. For example, the device 250 may store the user's 300 favorite color, shape, and/or texture as a component. The device 250 may store components as a vector representation and use the components as input to train a generative neural network or to alter an existing generative model. In some aspects, the generative model may use a component to generate a 3D mesh as an output.

As discussed, the device 250 may be an AR device, such that, the 3D object generated by the generative model is superimposed onto a scene comprising real and/or virtual elements. In other cases, the device 250 may be a VR device, such that the 3D object generated by the generative model is superimposed onto an entirely virtual scene.

The device 250, whether it be an AR device or a VR device, may utilize a generative model and other computational aspects to display 3D objects (e.g., models) based on the user's 300 input. The computational aspects of the device 250 may execute on the device 250 itself or the device 250 one or more other devices (e.g., co-device). For example, a user 300 may wear an AR headset, such as the device 250 described with reference to FIGS. 2, 3, 4A, 4B, and 4C that communicates with a smartphone. In this example, the AR headset may transmit visual information to the smartphone, and the smartphone may generate a 3D object via a generative model executed by the smartphone, and the smartphone may then transmit the 3D object to the AR headset. In other aspects, the computational aspects of the device 250 may execute entirely on the device 250 itself.

Figure 5:
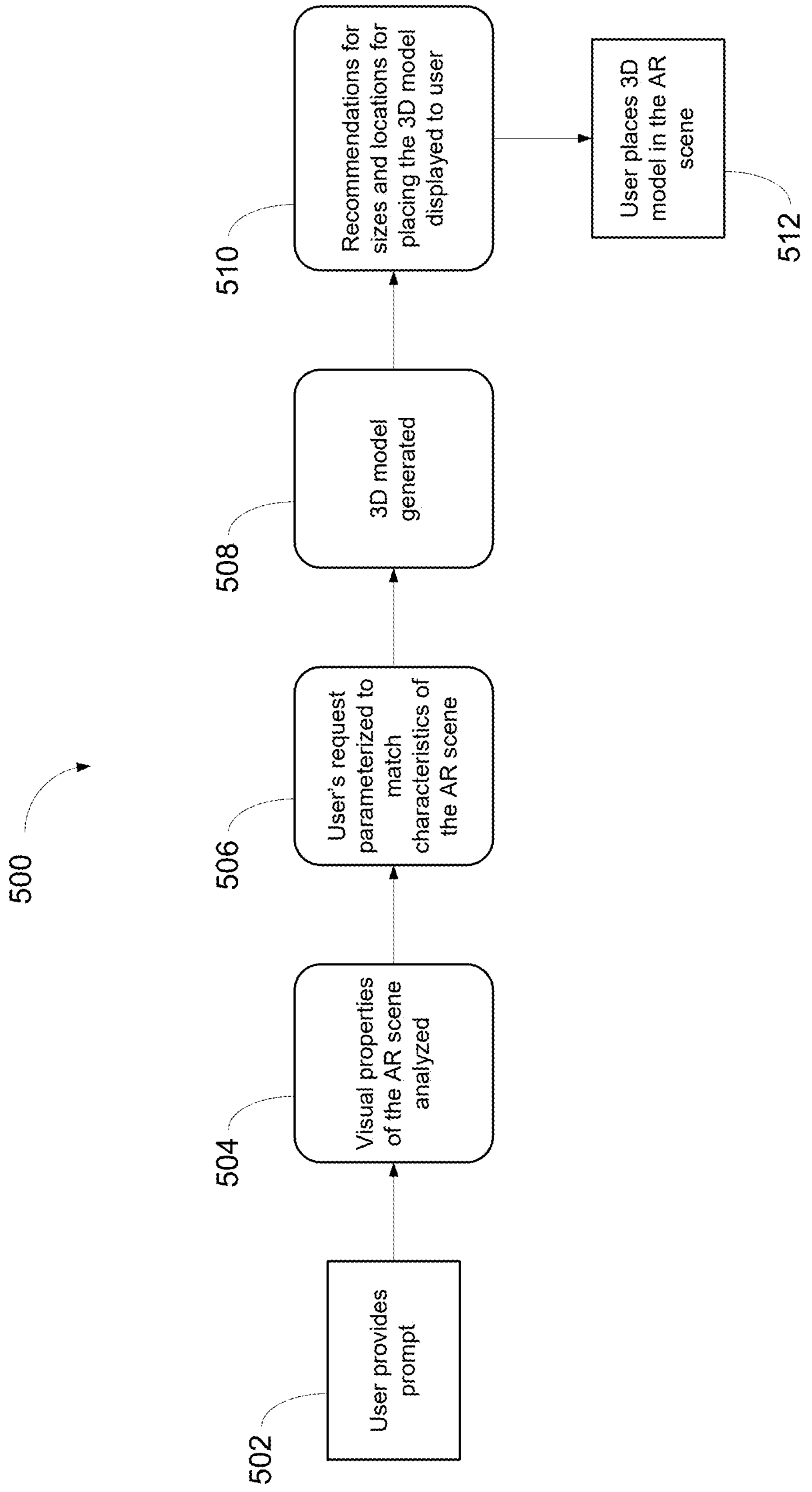
FIG. 5 is a flow diagram illustrating a context-based process for generating a 3D object, in accordance with various aspects of the present disclosure.

FIG. 5 is a block diagram illustrating a context-based process for generating a 3D object into a scene, in accordance with aspects of the present disclosure. The scene may be an example of the scene 306 describe with reference to FIGS. 3, 4A, 4B, and 4C. The process 500 enables the user 300 to generate 3D objects from a user input, such that the 3D objects may be dynamically injected into the scene, based on the context of the scene. The scene may be a virtual scene, an augmented reality scene, or another type of scene. At block 502, the user 300 provides a prompt to a generative model. The prompt may be text that is converted from the user's 300 speech or text that is typed by the user 300. For example, the user 300 may use a microphone to prompt the device 250 to create a desk.

At block 504, the device 250 analyzes visual properties of the scene 306. In some aspects, the device 250 may implement one or more of a combination of sensors, such as cameras, depth sensors, infrared sensors, and LiDAR (Light Detection and Ranging) sensors. The sensors capture information regarding the user's 300 environment, measuring variables such as depth, color, and texture. The device 250 uses a computer vision function to identify surfaces, objects, and spatial relationships within the scene 306. Examples of computer vision functions may include, for example, scale-invariant feature transform (SIFT), speeded up robust features (SURF), a convolutional neural network (CNN), and/or any other computer vision functions. Additionally, the device 250 uses the one or more computer vision functions to discern the context of the scene 306. For example, the device 250 may use a residual neural network to interpret the sensor information and identify that the scene 306 involves a generic location, such as a classroom or a home office.

At block 506, the device 250 parameterizes the user's 300 prompt to match the characteristics of the scene 306. For example, if the user's 300 initial prompt was to create a desk, and the device 250 determines that the scene 306 is within a home office, the device 250 may add the parameter "home office" to the user's 300 prompt of "create a desk." The device 250 may add more parameters apart from or instead of a location parameter. For example, if the predominate furniture theme of the room is black (e.g., the room has mostly black furniture), the device 250 may add "black" as an additional parameter to the user's 300 initial request to create a desk. As another example, if the room contains objects that indicate a presence of children, such as toys or a crib, the device 250 may add "child-friendly" as an additional parameter to the user's 300 initial request to create a desk. To parameterize the user's 300 prompt to match the characteristics of the scene 306, the device 250 may alter the user's 300 prompt or may pass additional variables to the generative model. For example, if the predominate furniture theme of the room is black, the device 250 may parameterize the user's 300 prompt by changing it from "create a desk" to "create a black desk." In other aspects, the device 250 may provide, as separate inputs, "create a desk" and "black" to the generative AI model. The device 250 may also recommend "black" in the material library discussed above, allowing the user to parameterize individual components of the 3D mesh. In this manner, the device 250 may utilize several different context-based inputs such as color, texture, and/or category.

At block 508, the device 250 generates a 3D object based on the user's 300 initial prompt and the context-related parameters of the scene 306, if any. The device 250 may use one or more known models for generating the 3D object, such as Shap-E or some other applicable neural network. Alternatively, the model may be a proprietary model. The model receives the initial prompt and parameters as an input, and outputs a 3D object (e.g., 3D model) based on the input. For example, if the user 300 prompts the device 250 to create a desk, and the user 300 is in a home office with a black theme and objects that indicate the presence of children, the device 250 may then generate a 3D object based on this context. In this example, the device 250 may generate a 3D object of a black desk that has no sharp corners. The device 250 may additionally modify the size of the 3D object to match the size of other objects in the environment. For example, if the home office is small, or has limited room available, the device 250 may then add a size restriction parameter to the user's 300 prompt and then create a desk that is sized to fit within the space available in the home office.

At block 510, the device 250 may recommend one or more of size or location for placing the 3D object and displays these recommendations to the user 300. At this point in the process 500, the device 250 may compare the dimensions of the 3D object with available locations in the room. If the 3D object would fit within the location of the room, then the device 250 may recommend that location for placement. For example, if the user 300 wants to place a virtual desk that is five feet wide, the device 250 may recommend placing the desk in a corner or in the center of the room, if the device 250 determines, via the computer vision algorithm, that the 3D object would not overlap with other real or virtual objects if the 3D object were placed in the corner or center of the room. The device 250 may use one or more methods to present the recommendations to the user 300. For example, the device 250 may present the recommendations to the user 300 by means of a virtual list or table rendered on the user's 300 display. In other examples, the device 250 may render silhouettes of the 3D object over the recommended placement area. The device 250 may use one or more methods to give precedence to the recommendations and present the recommendations to the user 300 in an order of precedence.

In some aspects, the device 250 may use a neural network to determine, based on a database of examples associated with the scene 306, where objects in the scene 306 are often placed. For example, the device 250 may use the neural network to determine that, based on a database associated with home offices, desks are more often placed in the corner of the home office than the center. The device 250 may then, based on output from the neural network, recommend that the desk be placed in the corner of the office rather than the center. The device 250 may additionally or alternatively use other methods to determine an order of precedence to the available placement areas of the 3D object. For example, the device 250 may also use a pathfinding function in addition to a neural network in order to recommend placement locations that would allow the user 300 to sit or stand behind the desk. In some aspects, the device 250 may generate a 3D object to correspond with one or more real objects in the environment. For example, the device 250 may generate a 3D model of a chair that corresponds to the size, shape, and/or color of a real desk in the environment.

At block 512, the user 300 places the 3D object into the scene 306. For example, if the device 250 displays a list of possible locations to the user 300, the user 300 may select one of the locations on that list. In other examples, the user 300 may use a wand or their hands to drag the table to the desired location.

Figure 6:
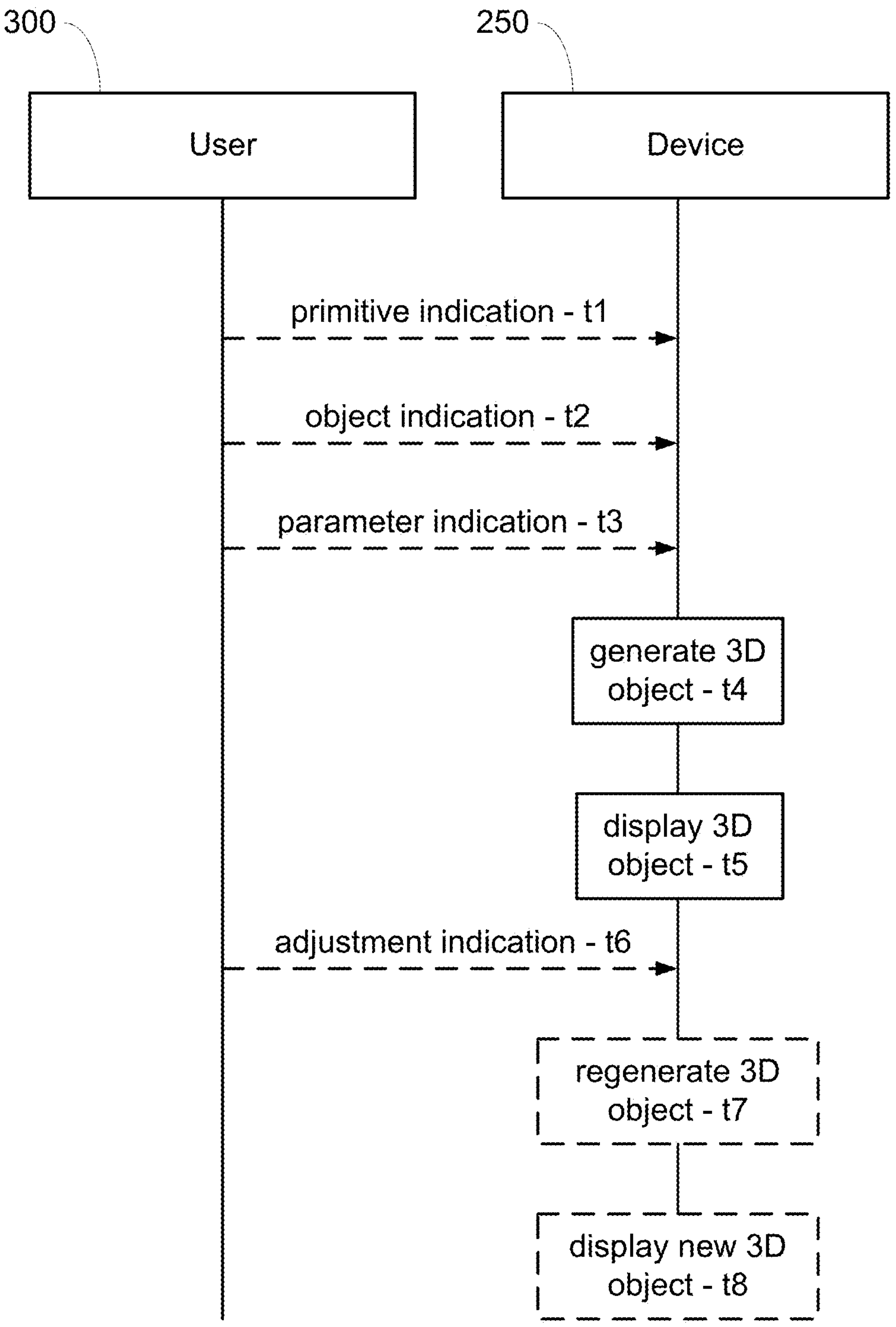
FIG. 6 is a timing diagram for generating a 3D object, in accordance with various aspects of the present disclosure.

FIG. 6 is an example of a timing diagram of a process 600 for generating a 3D object via a generative model, in accordance with various aspects of the present disclosure. In the example of FIG. 6, a user 300 interacts with a device 250. For example, the user 300 wears the device 250.

At time t1, the user 300 may provide a primitive indication to the device 250. The user 300 may use one or more different methods to provide the primitive indication to the device 250. In some aspects, the user 300 may provide a vocal prompt or a text prompt. For example, the user 300 may use a microphone to prompt the device 250 to "create a sphere." In other aspects, the user 300 may select a shape from a database of shapes provided by the device 250. For example, the user 300 may be able to select a shape from a menu of shapes displayed via a UI of the device 250 or provided to another device, such as a mobile device of the user 300.

At time t2, the user 300 may provide an object indication to the device 250. The user 300 may use one or more different methods to provide the object indication to the device 250. In some aspects, the user 300 may provide a vocal prompt or a text prompt. In other aspects, the user 300 may select an object from a database of objects. For example, the user 300 may use a keyboard to prompt the device 250 to "render a couch."

At time t3, the user 300 may provide a parameter indication to the device 250. The user 300 may use one or more different methods to provide the parameter indication to the device 250. In some aspects, the user 300 may provide a vocal prompt or a text prompt. In other aspects, the user 300 may select a parameter from a database of parameters. The term parameter may refer to one or more parameters related to the desired 3D object. In some examples, the parameter indication may include a color, texture, or size of the desired 3D object. Additionally, or alternatively, the parameter indication may include a complex modifier regarding the desired 3D object. For example, the user 300 may prompt the device 250 to "place a Victorian-style couch with gold trimmings." In this example, the user 300 has provided "Victorian-style" and "gold-trimmings" as parameter indications in addition to the "couch" object indication.

As discussed, the user 300 may use various methods to provide input to the device 250. The user 300 may provide a vocal prompt or a text prompt, or the user 300 may select indications from a database of indications. In some aspects, the user 300 may use gestures to provide indications. For example, the user 300 may use a wand 304 or the user's 300 hand to point to door. In this example, the device 250 may interpret the user's 300 gesture as a "door" object indication. Additionally or alternatively, the device 250 may copy the color of the door as a parameter indication, and/or the device 250 may copy the shape of the door as a primitive indication. The user 300 may use the indication as input for generating a 3D object and/or store the indication in a database for later use.

The indications at times t1-t3 may be provided in any order. Additionally, the user may provide a subset of the indications at times t1-t3. For example, the user 300 may only provide the parameter indication and the object indication prior to the device 250 generating a model at time t4.

At time t4, the device 250 generates a 3D object based on the user's 300 indications. Specifically, the device 250 generates the 3D object based on the primitive associated with the primitive indication and the object indicated via the object indication. For example, the user 300 may place a 3D rectangle in a scene and then prompt the device 250 to generate a table. At time t4, the device 250 generates, via a generative model, a table corresponding to the size and shape of the 3D rectangle.

At time t5, the device 250 displays the 3D object generated at time t4. The device 250 may display the 3D object at a position indicated by the user 300, or the device 250 may display the 3D object at a recommended position based on the environment. If the device 250 is an augmented reality (AR) device, the device 250 may overlay the 3D object onto a scene, such as the scene 306 described with reference to 306. In some examples, the device 250 may be a VR device. In such examples, the device 250 may display the 3D object in a virtual scene viewed by the user 300.

At time t6, the user 300 may provide an adjustment indication to the device 250. The adjustment indication may include an object indication and/or a primitive indication. The adjustment indication may also include a parameter indication for regenerating the 3D object. In some aspects, the user 300 may provide one or more parameters, such as a desired texture, color, or feature desired of the regenerated 3D object. In other aspects, the one or more parameters may be associated with one or more other objects in the environment. For example, the user may 600 may instruct the device 250 to make the 3D object match a desk. In still other aspects, the device 250 may implement a context-based process for discerning the parameters, such as the context-based process for inpainting a 3D object into a scene. At time t7, the generative model associated with the device 250 may regenerate the 3D object. For example, the user 300 may instruct the device 250 to "make the object blue." In response, the device 250 may regenerate the 3D object such that the regenerated 3D object is blue. At time t8, the device 250 may display the new 3D object (e.g., regenerated 3D object) based on the re-generation performed at time t7.

Figure 7:
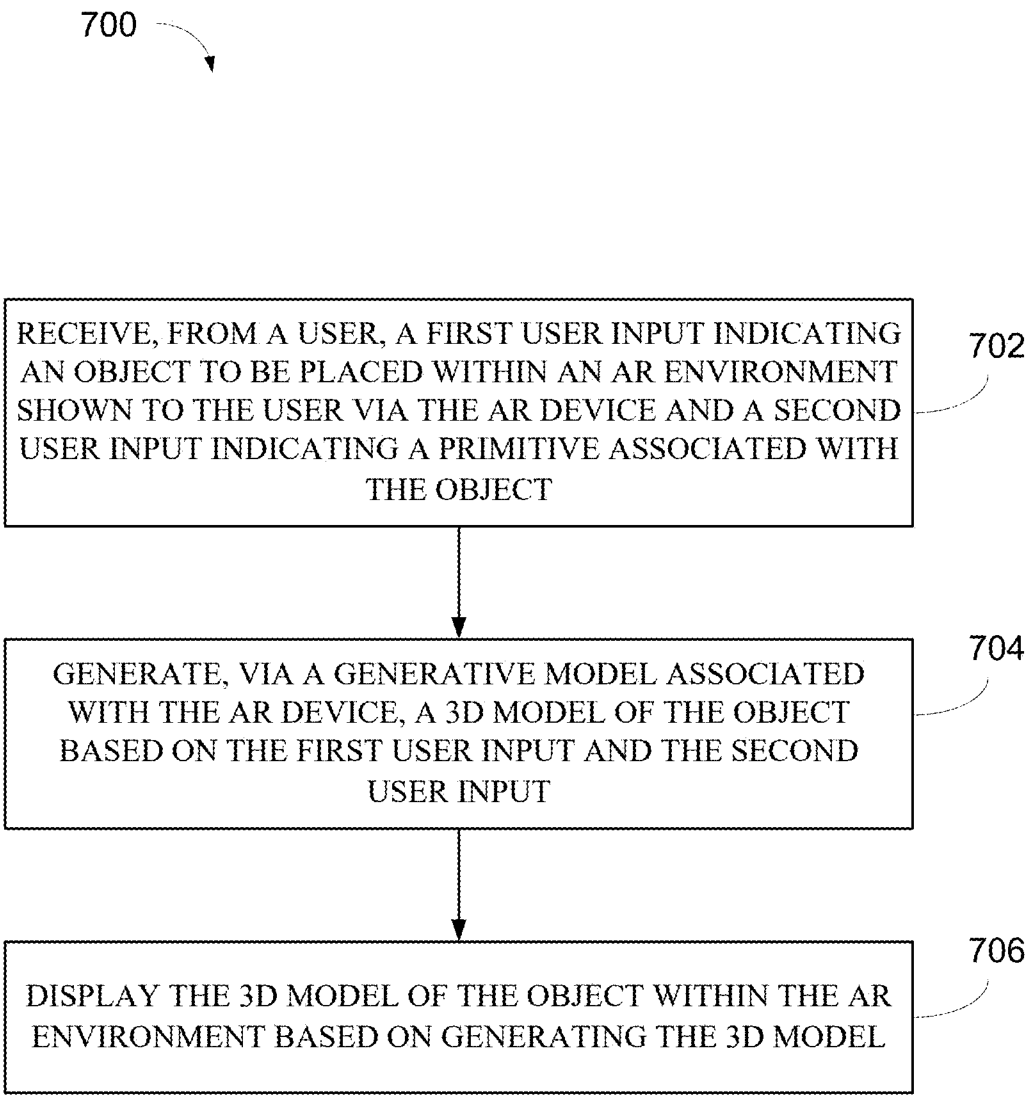
FIG. 7 is a flow diagram illustrating an example of a process for displaying 3D objects on an AR device, in accordance with various aspects of the present disclosure.

FIG. 7 is a flow diagram illustrating an example process 700 performed by a 3D generative model 260, in accordance with some aspects of the present disclosure. The example process 700 is an example of a process for displaying 3D objects on a device, in accordance with aspects of the present disclosure. The process 700 may be performed by, for example, the device 250, generative model 260, and/or system 100. As shown in FIG. 7, in some aspects, the process 700 begins at block 702 receiving, from a user, a first user input indicating an object to be placed within an environment shown to the user via the device and a second user input indicating a primitive associated with the object (block 702). The first input and second input may be a vocal prompt or a text prompt.

At block 704, the process 700 generates, via a generative model associated with the device, a 3D model of the object based on the first user input and the second user input (block 704). The generative model may be a known model, such as Shap-E or some other applicable neural network. Additionally, or alternatively, the generative model may be a proprietary model. The model may take the initial prompt, primitive, and/or parameters as an input, and output a 3D model based on the input. For example, the user 300 may intend to create a 3D model of a desk. The user 300 may start by selecting a rectangular prism from a database displayed by the device 250. The device 250 may then render the rectangular prism within the user's 300 field-of-view. After adjusting the proportions of the desk using gestures, the user 300 may input the following prompt into the device 250: "convert this shape into a desk." The device 250 may then use a generative AI model to create a 3D desk with substantially the same proportions as the rectangular prism. The device 250 may generate the 3D desk based on additional inputs received from the user 300 or discerned based on the context of the environment. For example, if the user 300 is in a home office with a black theme and objects that indicate the presence of children, the device 250 may then generate a 3D object based on this context. In this example, the device 250 may generate a 3D black desk (e.g., 3D model of a black desk) that has no sharp corners. The device 250 may additionally modify the size of the 3D object to match the size of other objects in the environment. For example, if the home office is small, or has limited room available, the device 250 may then add a size restriction parameter to the user's 300 prompt and then create a desk that is sized to fit within the space available in the home office.

At block 706, the process 700 displays the 3D model of the object within the environment based on generating the 3D model (block 706). In some aspects, the device may render the generated 3D model onto the user's 300 display. For example, if the user 300 prompts the device to create a bed, the device 250 may create a bed via the generative model and display the bed as virtual content.

Figure 8:
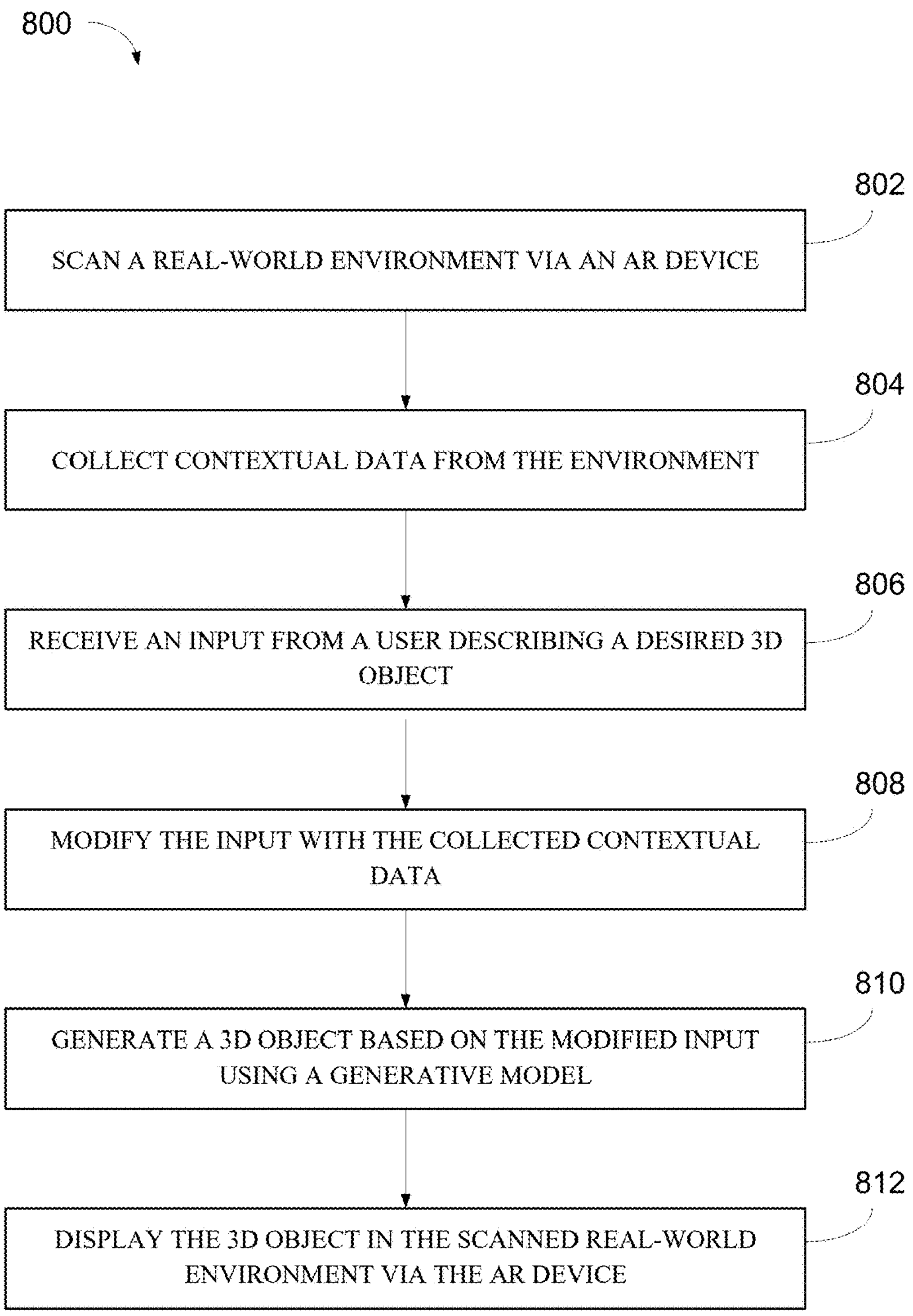
FIG. 8 is a flow diagram illustrating an example of a process for inpainting a 3D object into a scene, in accordance with various aspects of the present disclosure.

FIG. 8 is a flow diagram illustrating a process for inpainting a 3D object into a scene, in accordance with aspects of the present disclosure. The scene may be an example of the scene 306 described with reference to FIGS. 3, 4A, 4B, and 4C. As shown in the example of FIG. 8, in some aspects, the process 800 includes scanning a real-world environment via an AR device (block 802). In some aspects, a device, such as the device 250 described with reference to FIGS. 2, 3, 4A, 4B, and 4C may use one or more of a combination of sensors, such as cameras, depth sensors, infrared sensors, and LiDAR (Light Detection and Ranging) sensors to scan the environment (e.g., scene). The sensors capture information regarding the user's 300 environment, measuring variables such as depth, color, and texture. The device 250 may then use a computer vision function to identify surfaces, objects, and spatial relationships within the scene 306.

The process 800 may also include collecting contextual data from the environment (block 804). The device may use one or more computer vision functions to discern the context of the environment. For example, the device may use a residual neural network to interpret the sensor information and identify a location of the environment, such as a classroom or a home office. In these examples, the device 250 may discern the context of the environment by interpreting aspects of the environment. For example, the device 250 may interpret the presence of a chalkboard and multitude of small desks to mean that the environment likely pertains to a classroom.

The process 800 may also include receiving an input from a user describing a desired 3D object (block 806). In some aspects, the user 300 may provide the input to the device 250 via an input device, such as a keyboard. In other aspects, the user 300 may orally provide the input to the device 250 via a microphone, and the device 250 may use a speech-to-text function to convert the user's 300 oral prompt into a text prompt.

The process 800 may also include modifying the input with the collected contextual data (block 808). For example, a user 300 may input: "create a bat." The device 250 then interprets the user's 300 input and create a bat. If the user 300 is at a baseball field, the device 250 may take the environmental context to mean that the user 300 would like to create a virtual baseball bat. If the user 300 is in a cave, the device 250 may take the environmental context to mean that the user 300 would like to create a virtual bat in the sense of a flying mammal. The device 250 may indicate the environmental context via a modified text prompt. For example, the device converts the initial prompt from "create a bat" to "create a baseball bat" prior to providing the prompt to the generative model.

The process 800 may also include generating a 3D object based on the modified input using a generative model (block 810). The generative model receives the initial prompt and any additional parameters as an input, and outputs a 3D object based on the input. For example, if the user 300 prompts the device 250 to create a desk, and the user 300 is in a home office with a black theme and objects that indicate the presence of children, the device 250 may then generate a 3D object based on this context. In this example, the device 250 may generate a 3D object of a black desk that has no sharp corners. The device 250 may additionally modify the size of the 3D object to match the size of other objects in the environment. For example, if the home office is small, or has limited room available, the device 250 may then add a size restriction parameter to the user's 300 prompt and then create a desk that is sized to fit within the space available in the home office.

The process 800 may also include displaying the 3D object in the scanned real-world environment via the AR device (block 812). In some aspects, the device 250 may render the generated 3D object on a display unit to be viewed by the user 300. For example, if the user 300 prompts the device 250 to create a bed, the device 250 may create a bed via the 3D generative model and display the bed as virtual content.

By adapting the generation, scaling, and placement of a 3D object in a manner tailored to the contextual characteristics of the scene 306, the process 800 presents allows advantages. For example, a device implementing the process 800 could tailor the color or patterns of the textures wrapping virtual 3D objects to match the colors in the environment that have been detected via the device.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine-readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for presenting a three-dimensional (3D) object within an augmented reality (AR) environment, comprising:

receiving, from a user, a first user input indicating a type of object to be placed within the AR environment shown to the user via an AR device and a second user input indicating a geometric primitive defining a base geometric structure for the type of object;

receiving, from the user, a third user input that places the geometric primitive at a location within the AR environment;

generating, via a generative model associated with the AR device, a 3D representation of the type of object in accordance with the geometric primitive, a shape of the 3D representation corresponding, in part, to the geometric primitive; and displaying the 3D representation at the location of the geometric primitive within the AR environment based on generating the 3D representation.

2. The method of claim 1, wherein:

the geometric primitive is displayed at the location within the AR environment prior to displaying the 3D representation; and the method further comprises receiving, from the user, a fourth user input adjusting a size and/or shape of the geometric primitive.

3. The method of claim 1, further comprising receiving, from the user, a fourth user input specifying one or more parameters associated with the type of object, wherein:

the one or more parameters include one or more of a texture, a color, or features; and the 3D representation includes the one or more parameters.

4. The method of claim 3, wherein at least one of the one or more parameters is associated with one or more other objects in the AR environment.

5. The method of claim 1, wherein the first user input is a text input or a voice input.

6. The method of claim 1, wherein the generative model customizes the 3D representation based on one or more elements associated with the AR environment.

7. The method of claim 6, wherein the one or more elements include one or more of a type of location of the AR environment or one or more other objects in the AR environment.

8. The method of claim 7, further comprising receiving, from the user, a fourth input identifying the one or more other objects.

9. The method of claim 1, wherein the first user input is the same as the second user input.

10. An apparatus for presenting a three-dimensional (3D) object within an augmented reality (AR) environment, comprising:

at least one processor;

at least one memory coupled with the at least one processor and storing instructions operable, when executed by the at least one processor, to cause the apparatus to:

receive, from a user, a first user input indicating a type of object to be placed within the AR environment shown to the user via an AR device and a second user input indicating a geometric primitive defining a base geometric structure for the type of object;

receive, from the user, a third user input that places the geometric primitive at a location within the AR environment;

generate, via a generative model associated with the AR device, a 3D representation of the type of object in accordance with the geometric primitive, a shape of the 3D representation corresponding, in part, to the geometric primitive; and display the 3D representation at the location of the geometric primitive within the AR environment based on generating the 3D representation.

11. The apparatus of claim 10, wherein:

the geometric primitive is displayed at the location within the AR environment prior to displaying the 3D representation; and execution of the instructions further cause the apparatus to receive, from the user, a fourth user input adjusting a size and/or shape of the geometric primitive.

12. The apparatus of claim 10, wherein:

execution of the instructions further cause the apparatus to receive, from the user, a fourth user input specifying one or more parameters associated with the type of object;

the one or more parameters include one or more of a texture, a color, or features; and the 3D representation includes the one or more parameters.

13. The apparatus of claim 12, wherein at least one of the one or more parameters is associated with one or more other objects in the AR environment.

14. The apparatus of claim 10, wherein the first user input is a text input or a voice input.

15. The apparatus of claim 10, wherein the generative model customizes the 3D representation based on one or more elements associated with the AR environment.

16. The apparatus of claim 15, wherein the one or more elements include one or more of a type of location of the AR environment or one or more other objects in the AR environment.

17. The apparatus of claim 16, wherein execution of the instructions further cause the apparatus to receive, from the user, a fourth input identifying the one or more other objects.

18. The apparatus of claim 10, wherein the first user input is the same as the second user input.

19. A non-transitory computer-readable medium having program code recorded thereon for presenting a three-dimensional (3D) object within an augmented reality (AR) environment, the program code executed by at least one processor and comprising:

program code to receive, from a user, a first user input indicating a type of object to be placed within the AR environment shown to the user via an AR device and a second user input indicating a geometric primitive defining a base geometric structure for the type of object;

program code to receive, from the user, a third user input that places the geometric primitive at a location within the AR environment;

program code to generate, via a generative model associated with the AR device, a 3D representation of the type of object in accordance with the geometric primitive, a shape of the 3D representation corresponding, in part, to the geometric primitive; and program code to display the 3D representation at the location of the geometric primitive within the AR environment based on generating the 3D representation.

20. The non-transitory computer-readable medium of claim 19, wherein the geometric primitive is displayed at the location within the AR environment prior to displaying the 3D representation; and the program code further comprises program code to receive, from the user, a fourth user input adjusting a size and/or shape of the geometric primitive.

* * * * *